United States Patent [19]
Deleris et al.

[11] 4,300,503
[45] Nov. 17, 1981

[54] PROCESS AND SYSTEM FOR COMPUTATION AND ADJUSTMENT OF OPTIMUM IGNITION ADVANCE

[75] Inventors: Robert Deleris, Bailly; Bernard Lepretre, Boulogne-Billancourt, both of France

[73] Assignee: Regie Nationale des Usines Renault, Billancourt, France

[21] Appl. No.: 141,147

[22] Filed: Apr. 17, 1980

[30] Foreign Application Priority Data

Apr. 26, 1979 [FR] France ................... 79 10598

[51] Int. Cl.³ .................. F02D 5/04; F02P 11/02
[52] U.S. Cl. .................... 123/425; 123/419; 123/422; 123/423; 123/415; 73/35; 73/DIG. 4
[58] Field of Search ............... 123/419, 422, 423, 425, 123/415, 417; 73/DIG. 4, 35

[56] References Cited
U.S. PATENT DOCUMENTS

4,002,155 1/1977 Harned et al. .............. 123/425
4,061,116 12/1977 Saida et al. ................ 123/415
4,163,385 8/1979 Kato et al. ................. 73/35
4,240,388 12/1980 Omori et al. ............... 123/425

Primary Examiner—Charles J. Myhre
Assistant Examiner—R. A. Nelli
Attorney, Agent, or Firm—Oblon, Fisher, Spivak, McClelland & Maier

[57] ABSTRACT

A novel process and system for computing and adjusting the optimum ignition advance in an internal combustion engine wherein knocking is detected by means of an accelerometer rigidly fastened to the cylinder head of the engine. An output from the accelerometer is integrated, converted into digital form, and processed by processing circuits to derive an average value $\overline{C}$ proportional to $\underline{n}$ preceding knocks and two comparison thresholds $S_1$ and $S_2$, each a linear function of the preceding average value $\overline{C}$. The accelerometer output integrated and converted into digital form is compared with each of these thresholds and the existence of a preknocking or audible knocking value is deduced and then used to act on the programmed electronic ignition advance.

12 Claims, 7 Drawing Figures

PROCESS AND SYSTEM FOR COMPUTATION AND ADJUSTMENT OF OPTIMUM IGNITION ADVANCE

BACKGROUND OF THE INVENTION

1. Field of the Invention

This invention relates to a process and system for computing and adjusting the optimum ignition advance on an internal combustion engine by means of a device for detecting knocking.

2. Description of the Prior Art

High-performance engines, such as supercharged or high-compression engines, have a tendency under full load to knock at an ignition advance setting which is clearly lower than optimum. In view of the inconvenience and even the risk of destruction of the engine which the presence of knocking represents, it is necessary, when using a classic ignition system, to select a centrifugal ignition principle with a wide margin (on the order of four degrees) with respect to the advance which initiates knocking. This can translate into a great loss of efficiency which, because of limitations in the choice of centrifugal principles, has effects even in the zones where knocking does not occur.

It has already been attempted, in a number of variants, to resolve the above problem. The principles of all these variants are the following:

- selection of a centrifugal principle close to the knocking point, or even past the knocking point;
- detection of the presence of knocking by measurement with an accelerometer and comparison with a threshold;
- more or less rapid reduction of the advance;
- instantaneous or progressive return to the nominal advance.

One of the problems with the recommended solutions lies in the choice of the threshold above which it is decided that there will be knocking. This choice must, in effect, take into consideration inter alia the differences between motors, variations in electronic gain, and the sensitivity of the sensor. This point is always delicate to adjust even in the case of so-called self-adapting thresholds.

In all of the prior art systems, the threshold chosen is the same for all cylinders of the engine. It is difficult to distinguish between knocking and the appearance of noises of mechanical origin. This is particularly true when one increases the sets of rockers.

The prior art systems only operate when in fact there is knocking. In the best cases, knocking cannot be totally eliminated, there remaining always a small number of knocks. This number may drop when the time for return to the nominal advance is increased, but then the engine remains longer in a zone of lowered efficiency.

SUMMARY OF THE INVENTION

Accordingly, the objects of this invention are to provide a novel system and process for computing optimum ignition advance and accordingly adjusting ignition advance which avoids the above-noted problems.

According to the present invention, the ignition advance is adjusted in terms of truly self-adapting thresholds, i.e. ones totally independent of progressive maladjustments or aging of the engine. In addition, with regard to detection, the cylinders are treated individually.

These and other objects are achieved according to the invention by providing a novel process for computing and adjusting the optimum ignition advance in an internal combustion engine and by means of a system for detecting knocking which proceeds from a sensor, such as an accelerometer, rigidly fastened to the cylinder head of the engine, a process notable in that the accelerometric signal undergoes analog processing comprising, in particular, integration inside a window of given dimensions. The integrated signal is converted into digital form, an average value $\overline{C}$ proportional to n preceding knocks is calculated, two comparison thresholds $S_1$ and $S_2$ are calculated, each a linear function of the preceding average value $\overline{C}$, the accelerometer value, integrated and converted into digital form, is compared with each of these thresholds and the existence or absence of a preknocking or audible knocking value is deduced and then used to act on the programmed electronic ignition advance.

According to one important characteristic, the process under the invention enables all cylinders of the engine to be processed successively for detection, one by one.

According to another important characteristic, the process under the invention uses truly self-adapting comparison thresholds $S_1$ and $S_2$, i.e. thresholds which are independent of progressive maladjustments and aging of the engine.

According to a third important characteristic of the process under the invention, the integration window extends 40° from each top dead center and from each bottom dead center successively encountered.

The present invention next relates to system for computing and adjusting the optimum ignition advance of an internal combustion engine by means of a system for detecting knocking, using a sensor such as an accelerometer, rigidly attached to the cylinder head of the engine. The system includes circuits for analog processing of the signal read from the accelerometer, including, in particular, an integrator, an integrator control logic circuit, an analog-digital converter, and a microcomputer including, in particular, a sequencer, a stage for computing an average value $\overline{C}$ proportional to n preceding knocks, two stages for computing comparison thresholds $S_1$ and $S_2$, which are linear functions of the previous average value $\overline{C}$, and circuits for deducing the presence or absence of a preknocking and/or audible knocking value.

According to a first characteristic of embodiment, the system for computing and adjusting the optimum ignition advance under the present invention, which is of the type comprising an angular position sensor connected to the flywheel, is notable in that the integrator control logic means include a phase locked loop connected to inputs D and H of a shift register having a certain number of parallel outputs, two RS flip-flops connected through their respective inputs to the appropriate outputs of the shift register and through their outputs to two analog switches located in the integrator circuit.

According to a second characteristic of embodiment, the system for computation and adjustment of the optimum ignition advance according to the present invention is notable in that the outputs of two type RS flip-flops mentioned above are also connected as inputs to an OR-only logic gate, the output of which is connected to the input of the sequencer which constitutes the first stage of the microcomputer, the latter being connected through its outputs to the stage for computing average value $\overline{C}$, on the one hand, on the other, to the analog-digital converter.

According to a third characteristic of embodiment, the system for computing and adjusting the optimum ignition advance under the present invention is notable in that the output of the analog-digital converter is parallel connected as an input into the stage for computation of average value $\overline{C}$ and into comparators, the first of which directly provides information relating to preknocking, while both, through a combination of their outputs, provide information relating to audible knocking.

According to a fourth characteristic of embodiment, the system for computing and adjusting the optimum ignition advance according to the present invention is notable in that the circuits for analog processing of the signal read from the accelerometer include the combination in series of a charge amplifier, a hi-lo filtering stage tuned to the resonance frequency of the combustion chamber, a first analog switch, and a double alternation rectifier stage, with the controlled integrator supporting, in parallel, the second analog switch and an output stage, of which the output conductor is connected as an input into the analog-digital computer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
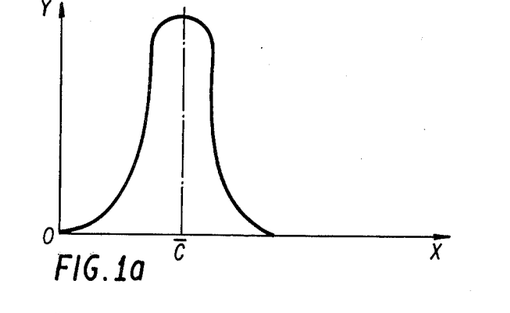
FIGS. 1a, 1b and 1c are graphs of three characteristic curves illustrative of operation of the invention.
Figure 1B:
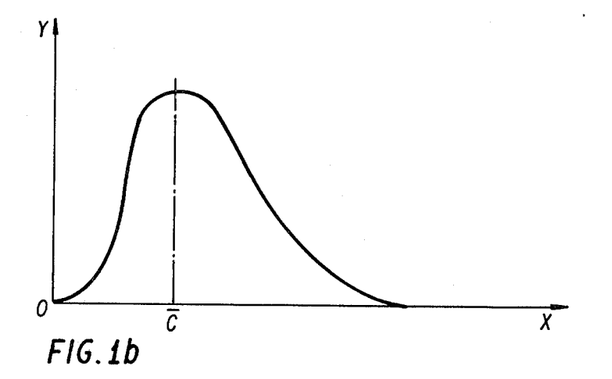
Figure 1C:
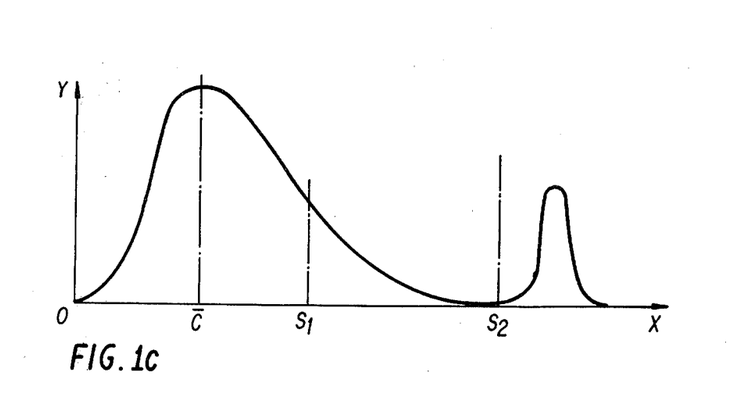
Figure 2:
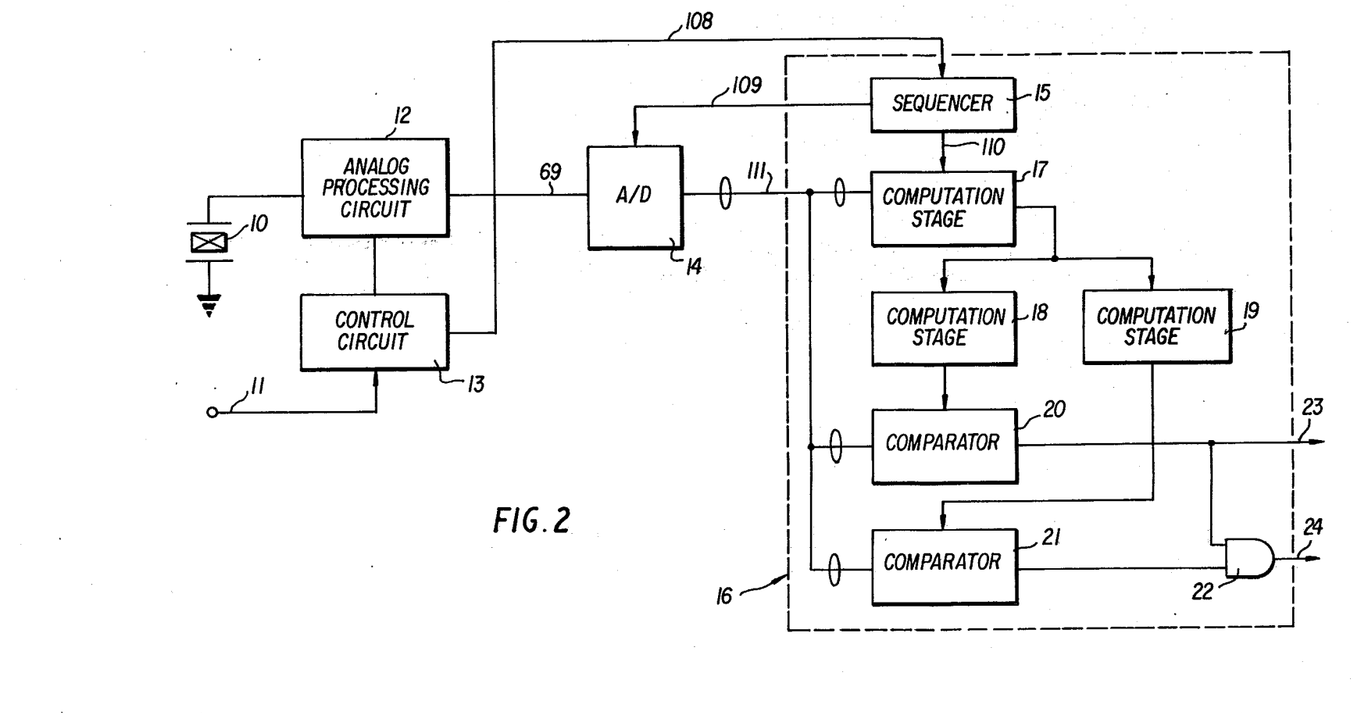
FIG. 2 is a block-diagram of an embodiment of the electronics of the system according to the invention.

Referring now to the drawings, wherein like reference numerals designate identical or corresponding parts throughout the several views, and more particularly to FIGS. 1 and 2 thereof, the knocking detection element 10 used is a piezoelectric accelerometer bolted to the cylinder head in an appropriate location. The signal at the output of the accelerometer 10 is amplified, filtered, and integrated inside a window, as described in more detail hereinafter. The result is a signal S.

Nextly considering a statistical analysis of the signal S, for a given engine speed and load in terms of the ignition advance, one obtains three characteristic curves according to the cases shown from top to bottom in FIGS. 1a, 1b and 1c, i.e. FIG. 1a represents the appearance of the statistical analysis of signal S in the absence of knocking. In this case, the curve has a classic shape known as a bell curve or Gaussian curve. FIG. 1b shows that a flattening of the right portion of the preceding curve occurs in the presence of preknocking, while curve 1c illustrates the same statistical distribution curve in the case of audible knocking. The flattening observed earlier is prolonged and a second signal crest appears. It is therefore interesting to generate an average value $\overline{C}$ proportional to the n preceding knocks and to use the average value $\overline{C}$ to compute two comparison thresholds $S_1$ and $S_2$ which are illustrated in FIG. 1c and which are assigned respectively to preknocking and audible knocking.

In this way, when one of the thresholds is crossed by the instantaneous value of the integrated signal coming from the accelerometer, several solutions can be envisioned for correcting the ignition advance when it is the source of preknocking or audible knocking.

According to the embodiment shown in FIG. 2, the output of the knocking detection element consisting of piezoelectric accelerometer 10 is connected as an input into a circuit 12 for analog processing of the signal generated by accelerometer 10. A second input 11 is connected to an angular position sensor joined to the flywheel of the vehicle in order to mark the passage of top dead center. The second input 11 is connected to the input of a logical control circuit 13 connected at an output thereof to an input of circuit 12 for analog processing of the accelerometer signal, on the one hand, and on the other, through its maintenance output 108, to an input of a computing unit 16 implemented by means of a microcomputer, the choice of which is not fundamental, and which is further described hereinafter.

The output of circuit 12 for analog processing of the accelerometer signal is connected to an input of analog-digital converter 14 of the successive approximation type, which has the function of digitalizing the signal processed analogically and integrated in circuit 12. The output of converter 14, which consists of a set number of parallel conductors (eight or sixteen, according to the type of equipment used for both converter 14 and microcomputer 16), is connected as an input to three different computational stages 17, 20 and 21 of micro-computer 16. The micro-computer 16 has two main outputs 23 and 24 over which appear the signals relating to preknocking, cylinder by cylinder (conductor 23), and those relating to knocking, cylinder by cylinder (conductor 24).

Figure 3:
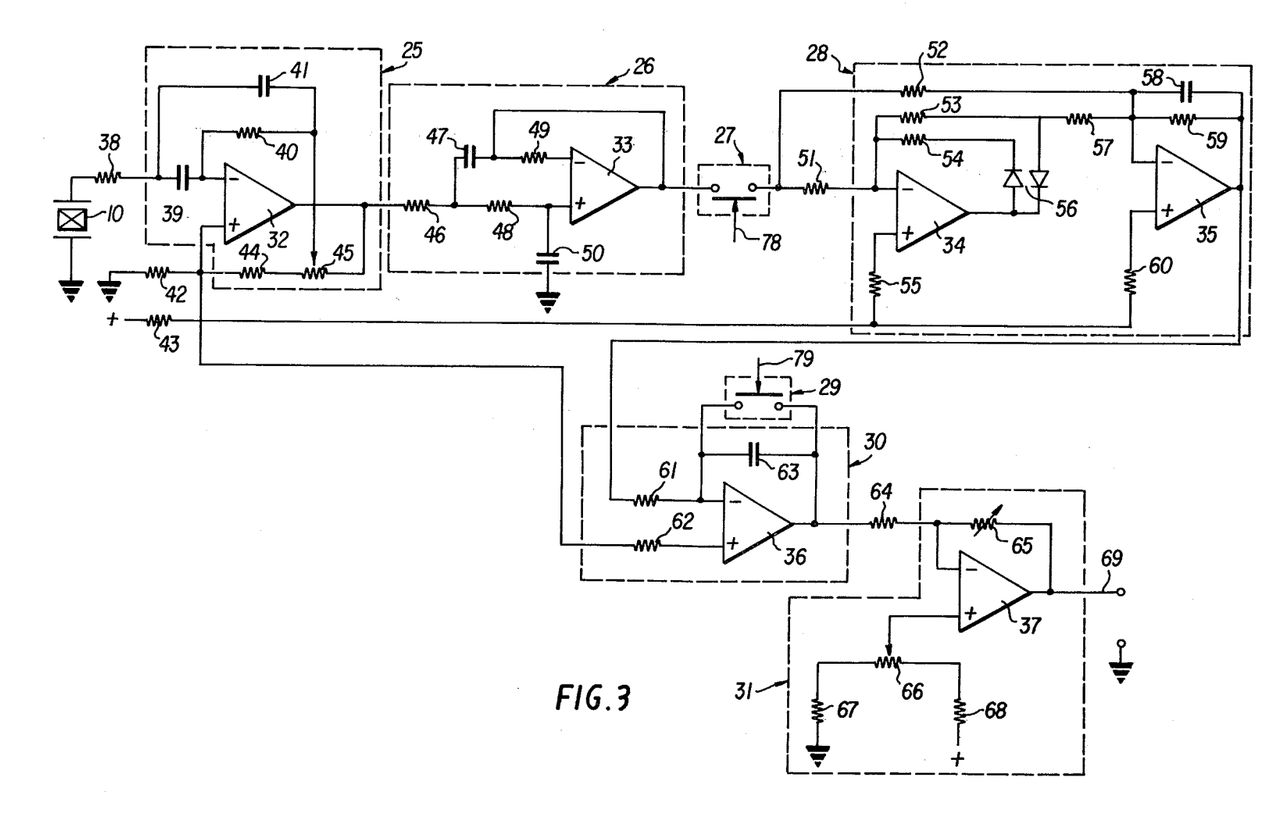
FIG. 3 is a detailed circuit diagram of circuits for processing of the analog signal coming from the accelerometric sensor used in FIG. 2.

FIG. 3 illustrates a detailed embodiment of circuit 12 of FIG. 2 relating to analog processing of the signal generated by accelerometer 10. The analog processing circuit comprises successively: a charge amplifier 25, a hi-lo filtering stage 26 set to the resonance frequency of the combustion chamber, a double alternation rectifier stage 28, a controlled integrator 30 operating over a window limited to top dead center, on the one hand, and on the other, to top dead center plus approximately 40°, by means of two switches 27 and 29 controlled from the logical control circuit 13 of FIG. 2, and finally, an output stage 31 producing output 69 which is connected as an input to the analog-digital converter 14.

In more detail, charge amplifier 25 consists of an operational amplifier 32, the inverting input of which is connected to the output of accelerometer 10 by the series connection of a resistance 38 and capacitor 39. A reverse feedback loop to amplifier 32 includes in parallel a resistance 40 and capacitor 41 for filtering the signal. By means of a network comprising the series connection of a resistance 44 and potentiometer 45 connected between the point common to resistance 40 and capacitor 41, on the one hand, and the non-inverting input of amplifier 32, on the other, the gain of the amplifier 25 can be adjusted without significantly modifying thereby the filtering constant of stage 26. A network of resistances 42 and 43, connected in series between ground and the plus terminal of the vehicle's battery and having the point common to the resistances connected to the non-inverting input of amplifier 32, forms a voltage shift equal to one-half the supply voltage, which produces a false ground, thereby enabling a monovoltage supply.

The output of operational amplifier 32, which constitutes a charge amplifier, is connected on the one hand to the non-inverting input of a second operational amplifier 33 through the series connection of two resistances 46 and 48. The non-inverting input of amplifier 33 is further connected to ground through capacitor 50. The inverting input of amplifier 33 is connected to the common connection of resistors 46 and 48 through the connection in series of a capacitor 47 and resistance 49. The output of operational amplifier 33 is connected by a feedback loop to the point common to capacitor 47 and resistance 49. Amplifier 33, connected to resistances 46, 48 and 49 and to capacitors 47 and 50, forms a low second-order filter at 12 dB per octave, with the inverting input of amplifier 33 receiving the signal issuing from charge amplifier 25.

The output of amplifier 33 is connected, through first analog gate 27 and a series resistance 51, to the inverting input of a third operational amplifier 34 forming part of double alternation rectifier stage 28. The output of operational amplifier 34 is connected to the inverting input of the same amplifier through two parallel loops comprising two diodes 56 mounted head-to-toe, each connected to a series resistance 54 and 53. The point common to resistance 53 and the anode of its associated diode 56 is connected, on the one hand, to the inverting input of a fourth operational amplifier 35 through a resistance 57 and, on the other hand, to the output of the fourth operational amplifier through a resistance 59 in series with resistance 57. Connected in parallel with resistance 59 is a capacitor 58 which is further connected by one to the point common to analog gate 27 and the resistance of input 51 through a resistance 52. The non-inverting inputs of operational amplifiers 34 and 35 which form the double alternation rectifier network 28 are both connected to the point common to resistances 42 and 43 through respective resistances 55 and 60. Capacitor 58 commences a slight integration at the rectification level.

The output of amplifier 35 is connected through series resistance 61 to the inverting input of a fifth operational amplifier 36, which forms an integrator stage under control of analog gate 29. The non-inverting input of operational amplifier 36 is connected to the point common to resistances 42 and 43. The output of operational amplifier 36 is connected, on the one hand, to its inverting input by a feedback loop consisting of a capacitor 63 connected in parallel with the second analog gate 29 and, on the other hand, to the inverting input of a sixth operational amplifier 37, forming an output stage, through series resistance 64. Amplifier 36 forms an integrator stage controlled by the second logic switch 29, itself controlled by the same logic block 13 which also controls switch 27. The output of operational amplifier 37 is connected to its inverting input by a feedback loop comprising an adjustable potentiometer 65 which enables adjustment of the value of the analog output voltage at 69. The non-inverting input of operational amplifier 37 is connected to the wiper of a potentiometer 66, the resistance of which is in series within a voltage dividing network which comprises, between ground and the plus terminal of the battery, the series connection of three resistances 67, 66 and 68, which compensate for any offsets in the previously described amplifiers.

Figure 4:
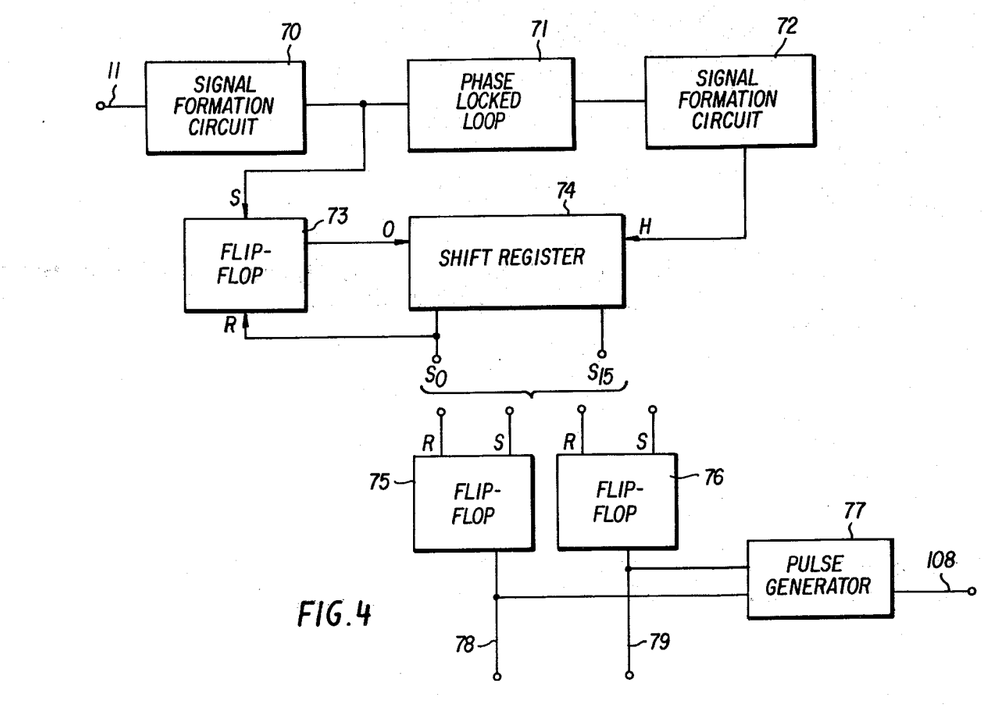
FIG. 4 is a block-diagram of circuits relating to logical control of the integrator and falling within the analog signal processing circuits shown in FIG. 3.
Figure 5:
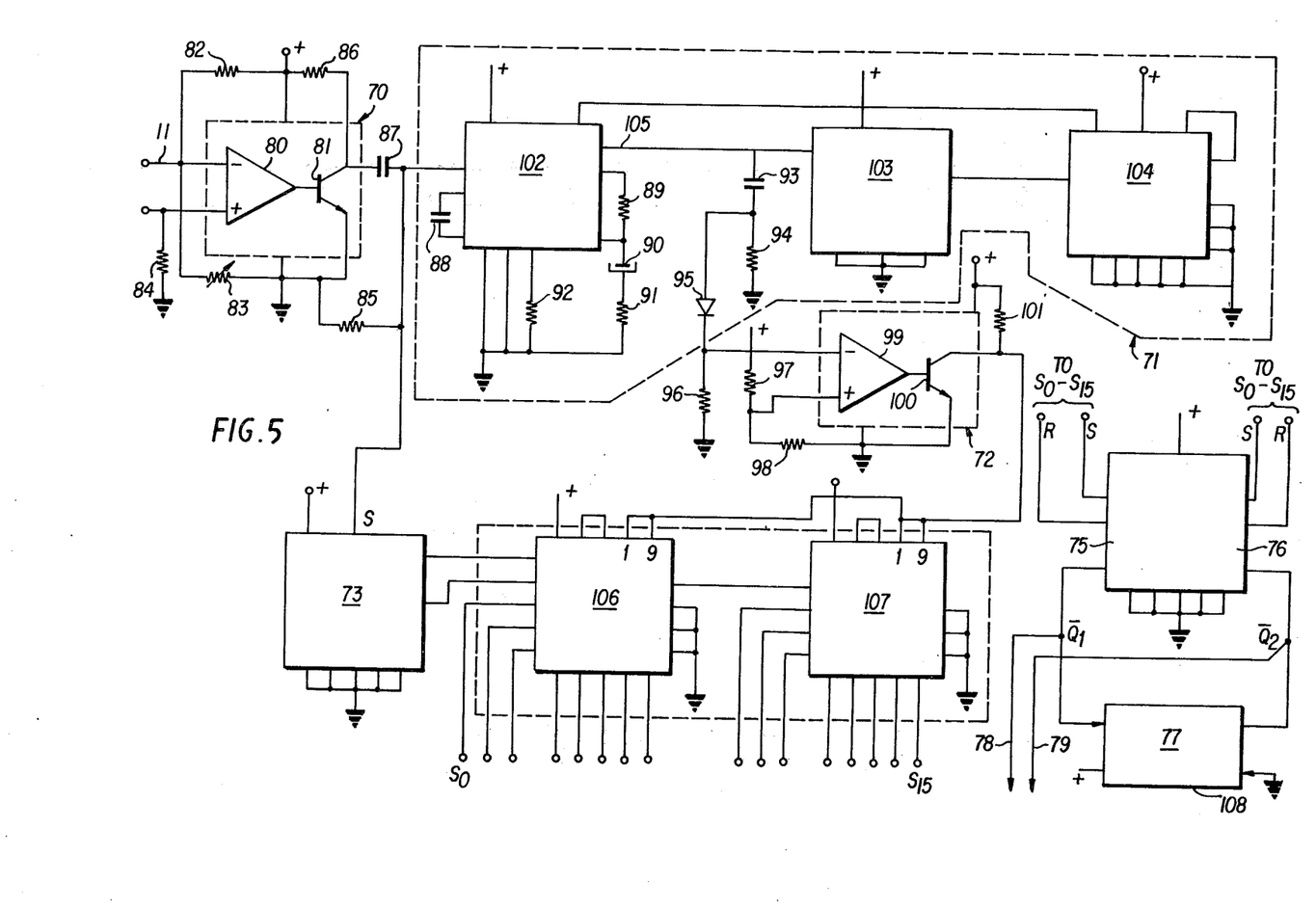
FIG. 5 is a detailed circuit diagram relating to logical control circuits for controlling the integrator shown in FIG. 4.

Nextly describing control logic block 13 which controls integrator 12, reference is made to FIGS. 4 and 5. In FIG. 4, input 11 (already encountered in FIG. 2) is connected to an angular position sensor and to a circuit 70 for formation of the signal sensed. The output of formation circuit 70 is connected, on the one hand, to a circuit 71 consisting of a phase locked loop, or PPL, and on the other hand, to an RS flip-flop 73. PPL circuit 71 is connected through its output to a formation circuit 72 and circuits 73 and 72 are connected through their outputs respectively to regular input D and the timer input H of a shift register 74 having sixteen parallel outputs $S_0$ to $S_{15}$, selected outputs of which are connected to inputs R and S of two steps 75 and 76, the respective outputs 78 and 79 of which are connected, on the one hand, to a circuit 77 for generating a maintenance pulse for sequencer 15 of microcomputer 16, and on the other hand, to switches 27 and 29 of FIG. 3, which control the operation of integrator 30–36.

FIG. 5 illustrates circuit details of an embodiment of control logic 13. Stage 70 for input and formation of the signal sensed by an angular position sensor of the top dead center or any other point of reference, connected to the flywheel, comprises a first operational amplifier 80, the output of which is connected to the base of an NPN transistor 81 mounted with the emitter thereof connected to ground. The collector of transistor 81 is connected to the inverting input of operational amplifier 80 by the connection in series of resistances 86 and 82, the common point of which is connected to the plus terminal of the battery. The non-inverting input of amplifier 80 is tied to ground through a resistance 84, and the inverting input of amplifier 80 likewise is tied to ground through a potentiometer 83. The collector of transistor 81 is connected to the first stage 102 of PLL loop 71 through a capacitor 87. The interconnection of capacitor 87 and PLL loop 71 is connected, on the one hand, to the emitter of transistor 81 through resistance 85 and, on the other hand, to qualification input S of the RS flip-flop 73. Resistance 82 and potentiometer 83 enable adjustment of the sensitivity of release of amplifier 80, which functions to shape the signal emanating from the angular position sensor. Resistance 86 serves as a charge for the output of amplifier 80–81 mounted as an open collector. The shunt system composed of capacitor 87 and resistance 85 serves to consider only the leading edge of sensor signal 11 formed by amplifier 80–81.

Circuits 102, 103 and 104, and particularly 102, which is connected to resistances 89, 91, 92 and to capacitors 88 and 90, form a classic PLL loop which delivers, between two successive peaks of connected angular sensor 11, signals 3.75° apart, whatever the speed of rotation at the output 105 of circuit 102. These signals are shunted by the network composed of a capacitor 93 and a resistance 94 and shaped in stage 72, which consists of a second operational amplifier 99 connected through its output to the base of a transistor 100, the emitter of which is tied to ground and the collector of which is coupled to the plus terminal of the battery through a series resistance 101. The inverting input of operational amplifier 99 is connected to the point common to a diode 95 and a series resistance 96 which forms a connection in series between ground and the point common to capacitor 93 and resistance 94 making up the shunt network connected to the output of circuit 102. The inverting input of operational amplifier 99 is connected to the point common to two resistances 97 and 98 connected in series and forming a voltage dividing point between the plus terminal of the battery and ground. Operational amplifier 99-100 associated with resistances 96, 97, 98, 101 enables shaping of the signals shunted by network 93, 94. Operational amplifiers 80 and 99 can be of the LM311 type from the National Semiconductor catalog, and circuits 102, 103 and 104 can be respectively types 14046, 14022 and 14018 from the same catalog.

The output of amplifier 99 which leaves the collector of transistor 100 is connected in parallel to inputs 1 and 9 of two shift registers 106 and 107, the set of which forms the equivalent of shift register 74 of FIG. 4. These shift registers are of the series input-parallel output type. Inputs 1 and 9 are the timers of registers 106 and 107, which may both be of the 14015 type from the National Semiconductor catalog.

The output of the shunt network made up of capacitor 87 and resistance 85 at the output of amplifier 70 is connected into input S of the RS flip-flop 73, with the input R of the flip-flop being activated by the first binary output figure of shift register 106. This means that when amplifier 70 delivers a sensor signal, the output of the RS flip-flop 73 which is connected onto the "data" input of shift circuit 106, passes into high state and is cleared by output $S_0$ of circuit 106. This pulse, thus created, moves over the various outputs $S_0$ to $S_{15}$ of shift circuits 106 and 107 at the timer speed of PLL loop 102, 103, 104.

From this fact, it is very easy to generate impulses of given angular width by connecting, for example, inputs R and S of flip-flop 75 to the appropriate outputs $S_0$ to $S_{15}$ of shift register 106-107. By performing the same operation relative to inputs R and S of a flip-flop 76, a second impulse of appropriate angular width is obtained. The RS flip-flop 73 and the set of RS flip-flops 75-76 can be of the 14013 type from the National Semiconductor catalog. These two impulses appear respectively at $\overline{Q1}$ and $\overline{Q2}$ on respective outputs 78 and 79 of flip-flops 75 and 76 and have the purpose of controlling analog switches 27 and 29 from FIG. 3. By producing control pulses $I_1$ and $I_2$ having different widths, applying narrower pulse $I_1$ to switch 27 and wider pulse $I_2$ to switch 29, the clearing of integrator 30-36 in FIG. 3 is delayed, even though switch 27, which authorizes the passage of the analog signal of sensor 10 has previously been closed. In this way, integrator 30-36 memorizes the maximum integrated value of the signal during the difference in width of the two control impulses.

Outputs $\overline{Q1}$ and $\overline{Q2}$ of the RS flip-flops 75 and 76 are likewise connected to the respective inputs of an OR-only logic gate 77 which furnishes to output 108, for microcomputer 16 of FIG. 2, a maintenance signal which is a step equal in phase and in width to the signal integrated and memorized in amplifier 30-36 of FIG. 3.

The role of the control block illustrated in FIGS. 4 and 5 is to enable the integration of the accelerometer signal only during the engine rotation phase where knocking is likely to occur, i.e., within an angular band located essentially between the top dead center and top dead center plus 40°, on the one hand, and on the other, between the bottom dead center and bottom dead center plus 40°. OR-only gate 77 may be of the CD4030 type from the National Semiconductor catalog.

We now return to FIG. 2, which illustrates schematically an embodiment of microcomputer 16.

Analog-digital converter 14 consists of a single commercial unit, type ADC800 from the National Semiconductor catalog. It operates by successive approximations to digitalize the signal integrated within amplifier 30-36 of FIG. 3, which appears over output 69 of the stage.

The essential role of microcomputer 16 of FIG. 2 is the computation of comparison thresholds intended for the cylinder by cylinder detection of knocking and preknocking, as was previously shown using FIG. 1.

In FIG. 2, two main parts are distinguished, i.e. a sequencer 15 and the rest of the circuits, which are threshold computation and comparison circuits inside microcomputer 16. Sequencer 15 is addressed by the maintenance signal coming through conductor 108 from OR-only gate 77 of FIG. 5 and enables, by virtue of connection 109, analog-digital converter 14 to ensure conversion of the analog data relating to each cylinder. This is because the maintenance signal is emitted twice per revolution of the engine, given that this signal is emitted in alternating association with top dead center and bottom dead center. Due to this fact, a digitalization for each cylinder is produced over conductor 111 at the output of converter 14. This individualized digitalization is sent toward computation blocks 17, 20 and 21, which are likewise piloted by sequencer 15 in such a way that the computation of comparison thresholds is also individualized and assigned to a given cylinder.

The computation of the average value $\overline{C}$ serving for the computation of thresholds $S_1$ and $S_2$, quantities which were illustrated and defined earlier with relation to FIG. 1, is carried out at stage 17 of the microcomputer 16 using a computational algorithm which can be the following:

$$\overline{C}_t = \overline{C}_{t-1} + \frac{\overline{C}_t - C_{t-1}}{n}$$

in which n is a digital filtering constant.

The result of the computation at stage 17 of each new average value $\overline{C}$ is presented in parallel over the inputs of computational blocks 18 and 19 in which the values of thresholds $S_1$ and $S_2$ illustrated in FIG. 1 are calculated at each pulse emitted by sequencer 15 over its output conductor 110, in such a way as to individualize the comparison thresholds for each successive cylinder. The two threshold computation blocks 18 and 19 perform their function by computing:

computation block 18: $S_1 = \overline{C}_t \times K_1 + K_1'$ computation block 19: $S_2 = \overline{C}_t \times K_2 + K_2'$ ratios in which $K_1$, $K'_1$, $K_2$ and $K'_2$ are constants.

The results of the computations of these two comparison thresholds are then sent onto the inputs of comparison blocks 20 and 21 respectively, which receive in parallel the instantaneous value of the knocking signal corresponding to a cylinder since they are both connected in parallel by conductor bundle 11 to the output of converter 14. According to the instantaneous knocking value, one of the two comparators, 20 which calculates quantity $\overline{C}_1$, and 21 which calculates $\overline{C}_2$, has its output assigned. Output 23 of comparator 20 furnishes preknocking value $S_1$ (FIG. 1b) while output 24 of AND logic gate 22, connected by its inputs to the outputs of the two comparators 20 and 21, furnishes knocking value $S_2$ (FIG. 1c).

The signal appearing eventually over one or the other of outputs 23 and 24 of microcomputer 16 is used to enlarge or lessen, with each half-turn of the flywheel, the advance programmed by the electronic ignition. This is obtained by sending toward the electronic ignition device a line of pulses of which each brings about modification of the advance by 1° counted along the periphery of the flywheel, with the sign being dictated by the zero/one value of another datum. Each line of pulses is sent at a precise moment in the half-turn, which results from the sending of a validation signal by the electronic ignition circuit. Numerous microcomputer models presently on the market can fulfill the conditions required of microcomputer 16. For example, this may be a type 8048 microcomputer from the American firm Intel.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the computation and adjustment of the optimum ignition advance for an internal combustion engine by means of a system for detection of knocking using a sensor such as an accelerometer rigidly attached to the cylinder head of the engine, comprising:
   integrating an accelerometer signal inside a given window;
   converting the integrated accelerometer signal into digital form;
   computing an average value $\overline{C}$ proportional to the n preceding knocks;
   computing two comparison thresholds $S_1$ and $S_2$, each a linear function of the previously computed average value $\overline{C}$;
   comparing the accelerometer value integrated in digital form with each of the thresholds $S_1$ and $S_2$;
   deducing the existence of absence of a preknocking and/or audible knocking value; and
   using said value to act on the programmed advance of the electronic ignition.

2. A process for the computation and adjustment of the optimum ignition advance according to claim 1, further comprising:
   processing each cylinder of the engine individually and successively for detection.

3. A process for computation and adjustment according to claim 1, further comprising:
   computing the comparison thresholds $S_1$ and $S_2$ individually and successively for each cylinder.

4. A process for computation and adjustment according to claim 3, further comprising:
   determining the comparison thresholds $S_1$ and $S_2$ from an average value $\overline{C}$ computed successively for each cylinder.

5. A process for computation and adjustment according to claim 4, further comprising:
   computing the next average value $\overline{C}$ based on n preceding values of $\overline{C}$.

6. A process for computation and adjustment according to claim 2, wherein truly self-adapting comparison thresholds $S_1$ and $S_2$ are used.

7. A process for computation and adjustment according to claim 1, comprising:
   integrating in an integration window extending 40° from each top dead center and bottom dead center.

8. A knocking detection system for the computation and adjustment of the optimum ignition advance for an internal combustion engine, comprising:
   an accelerometer rigidly attached to the cylinder head of the engine for detecting knocking;
   analog processing means for processing a knocking signal read from the accelerometer, said analog processing means comprising,
   an integrator for integrating the accelerometer knocking signal,
   logic means for controlling the operation of the integrator,
   an analog-digital converter for digitalizing the integrator output, and
   a microcomputer including a sequencer, a stage for computation of an average value $\overline{C}$ proportional to n preceding knocks, two stages for computation of comparison thresholds ($S_1$, $S_2$) which are each a linear function of the average value $\overline{C}$ computed previously, and means for deducing the presence or absence of a preknocking and/or audible knocking value.

9. A system for computation and adjustment of the optimum ignition advance for an internal combustion engine according to claim 8, of the type provided with an angular position sensor connected to the flywheel, further comprising:
   said integrator control logic means comprising,
   a phase locked loop,
   a shift register having inputs (D, H) connected to said phase locked loop and having a set number of outputs, two RS type flip-flops connected through their respective inputs to selected of the outputs of said shift register and through their respective outputs to two analog switches disposed in the circuit of said integrator.

10. A system for computation and adjustment of the optimum ignition advance for an internal combustion engine according to claim 9, further comprising:
    an OR-only logic gate having inputs connected to the outputs of the two RS type flip-flops and having an output which is connected to the input of said sequencer of said microcomputer, said sequencer being connected through its outputs to the stage for computation of average value $\overline{C}$, on the one hand, and on the other, to said analog-digital converter.

11. A system for computation and adjustment of the optimum ignition advance for an internal combustion engine according to claim 10, further comprising:
    a pair of comparators, a first of which, through its outputs, directly provides information relating to preknocking, and both of which, by a combination of their outputs, provide information relating to audible knocking; and
    the output of said analog-digital converter connected in parallel as an input into the stage for computation of average value $\overline{C}$ and into said pair of comparators.

12. A system for computation and adjustment of the optimum ignition advance for an internal combustion engine according to claim 8, further comprising:

said analog processing means comprising,
a series combination of a charge amplifier,
a hi-lo filtering stage coupled to the charge amplifier and set to the resonance frequency of the combustion chamber of the engine;
a first analog switch having one side coupled to said filtering stage,
a double alternation rectifier stage coupled to the other side of said first analog switch,
a second analog switch connected in parallel with the controlled integrator, and
an output stage having an output conductor which is connected as an input into said analog-digital converter.

* * * * *